Sept. 21, 1926.
L. L. WHITNEY
1,600,781
METHOD OF FORMING BRAKE LEVER JAWS
Filed July 14, 1924
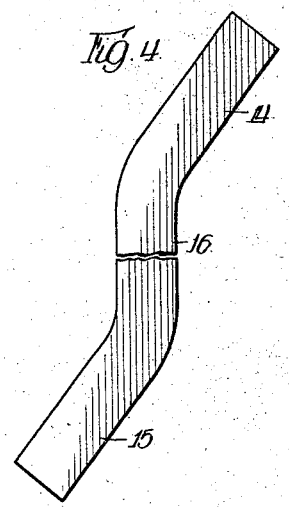
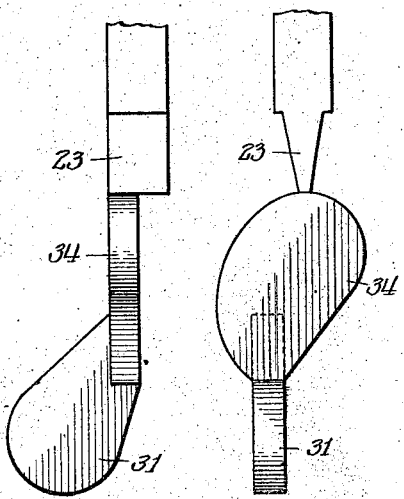
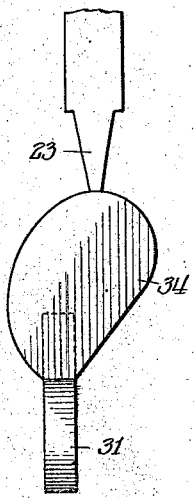
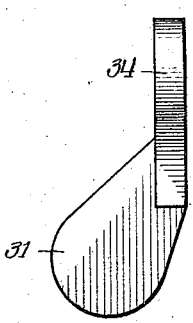
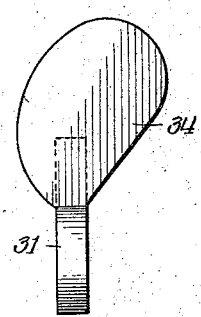
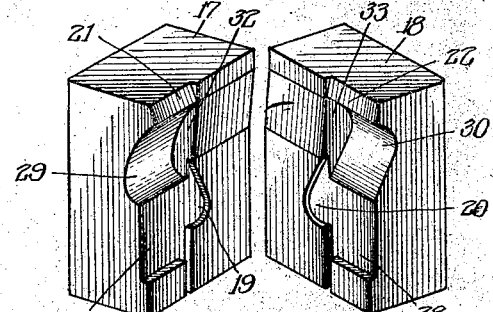
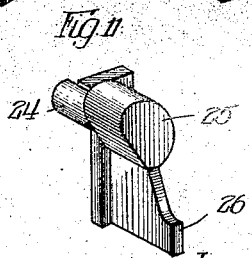
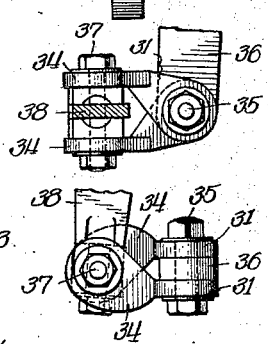
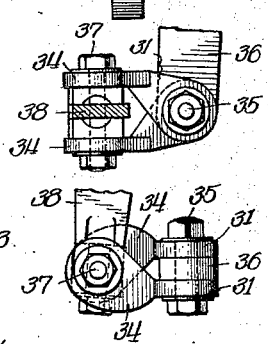
Witness:
R. Burkhardt
Inventor:
Loren L. Whitney,
By Wilkinson Huxley Byron & Knight
attys Patented Sept. 21, 1926.

1,600,781

UNITED STATES PATENT OFFICE.

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY.

METHOD OF FORMING BRAKE-LEVER JAWS.

Application filed July 14, 1924. Serial No. 725,765.

This invention relates to a new and improved method of forming brake lever jaws or the like and more particularly to a method of forming such jaws having portions extending in different planes bearing angular relations to each other.

Jaws of this character are used in connecting brake levers and other brake elements and involve pivot portions adapted to receive pivots located in different planes, as, for example, pivots having axes at right angles to each other.

It is an object of the present invention to provide a new and improved method of forming such jaws which method forms the elements in planes bearing angular relation to each other by the application of force in directions normal to the planes of the elements.

It is an additional object to provide a method whereby such jaws may be formed by the substantially simultaneous application of force in the desired directions.

It is an additional object to provide a method which is adapted to operate upon simple forms of blanks with a minimum loss of metal and which is adapted for rapid commercial production.

Other and further objects will appear as the description proceeds.

I have shown in the accompanying drawings the blanks used in the operation, in various stages of the operation, the dies suitable for performing the operation and fragmentary views illustrating the application of the jaws.

In the drawings:—

Figure 1 is an end view of the blank;

Figure 2 is a plan view of the blank;

Figure 3 is an end view of the blank after the bending operation;

Figure 4 is a face view of the blank after the bending operation;

Figure 5 is a view of one end of the blank after the forging operation;

Figure 6 is a view similar to Figure 5 taken at right angles thereto;

Figures 7 and 8 are views similar to Figures 5 and 6 but showing the jaws cut from the blank;

Figures 9 and 10 are views of dies suitable for the operation;

Figure 11 is a view of the forging plunger used with the dies of Figures 9 and 10;

Figure 12 is a fragmentary view illustrating the application of the jaw formed; and Figure 13 is a view taken at right angles to Figure 12.

The blank used as shown in Figures 1 and 2 is preferably a rectangular bar of metal. In the first operation the ends 14 and 15 of the bar are bent at similar angles to the intermediate portion of the bar 16. One end of the bar is then heated and placed between dies 17 and 18 shown in Figures 9 and 10. The bar is placed between the dies in such manner that the lower angular end 15 rests between the portions 19 and 20 of the dies. The intermediate straight portion 16 extends upwardly vertically between the portions 21 and 22 of the dies.

The dies are now brought together and the lower end 15 of the bar is flattened between the portions 19 and 20. The intermediate portion of the bar is pinched in by portions 21 and 22 of the dies to the form shown at 23 of Figures 5 and 6. The upper portions serve as a holder during this portion of the operation.

Substantially simultaneously with the closing together of the dies 17 and 18 the plunger 24 has its portions 25 and 26 introduced between the dies. The portion 26 passes between portions 27 and 28 of the dies and the portions 25 passes between portions 29 and 30 of the dies. The portion 26 cooperates with the portions 19 and 20 to form the lower end of the bar to the contour shown at 31 in Figures 5 and 6. Similarly portion 25 of the plunger presses the metal against the portions 32 and 33 of the dies to flatten out and form the portion 34 of the jaws. The contour of this portion 34 is maintained by the portions 29 and 30 of the dies. The portion 23 by which the formed jaws are connected to the remainder of the bar, serves to permit that portion of the bar to be used as a holder throughout the process and also serves to receive any excess metal which may be forced out between the dies during the forging process.

The opposite end 14 of the bar is now heated and treated in exactly similar manner. The portions 23 are next cut away from the formed jaws which are then in the form shown in Figures 7 and 8. To complete the jaws the portions 31 and 34 are each drilled by suitable means to provide for receiving pivot pins.

As shown in Figures 12 and 13 the portions 31 receive the pivot pin 35 by which they are connected to member 36. Portions 31 receive the pivot pin 37 by which they are connected to the member 38. These pivots are located with their axes at right angles to each other.

While my improved method has been described in connection with one specific type of jaws it is obviously capable of modification to form other types of jaws and I contemplate such changes and modifications as come within the spirit and scope of the appended claims.

I claim:

1. The method of forming brake lever jaws or the like having elements extending in different planes which comprises applying pressure to one portion of a blank perpendicular to the plane of one element to form that element and substantially simultaneously applying pressure in a direction perpendicular to another element to form said latter element.

2. The method of forming brake lever jaws or the like having elements extending in different planes which comprises bending a bar blank, applying pressure to a portion of the blank on one side of the bend in a direction perpendicular to the plane of the element to be formed therefrom, and applying pressure to a portion of the blank on the opposite side of the bend to form another element, the latter pressure being applied in a direction perpendicular to the plane of the latter element.

3. The method of forming brake lever jaws or the like having elements extending in different planes which comprises applying pressure to one portion of a blank perpendicular to the plane of one element to form that element, applying pressure in a direction perpendicular to another element to form said latter element, and similarly treating portions of the opposite end of the blank to form a second brake lever jaw, whereby portions of the blank are not treated during each step in the operation and may be used as holders.

4. The method of forming brake lever jaws or the like having elements extending in different planes which comprises applying pressure to one portion of a blank perpendicular to the plane of one element to form that element, applying pressure in a direction perpendicular to another element to form said latter element, and similarly treating portions of the opposite end of the blank to form a second brake lever jaw, and leaving untreated an intermediate portion of the blank which remains connected to both the formed portions of the blank during the operation and serves to receive any flow of excess metal.

Signed at Hammond, Indiana, this 9th day of July, 1924.

LOREN L. WHITNEY.